(Model.) 3 Sheets—Sheet 1.
W. MARKS.
FERTILIZER DISTRIBUTER.
No. 260,764. Patented July 11, 1882.
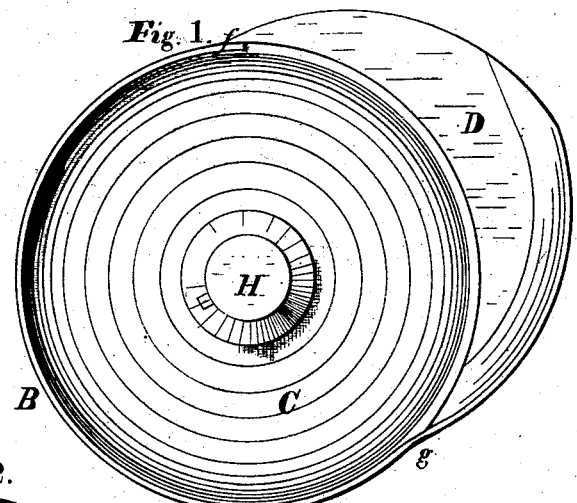
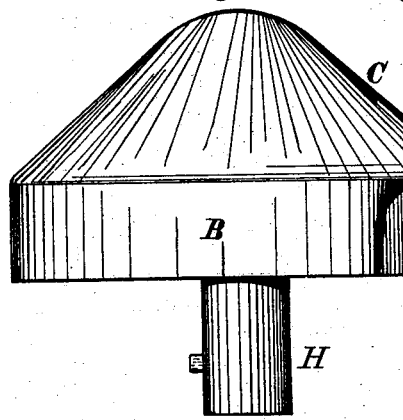
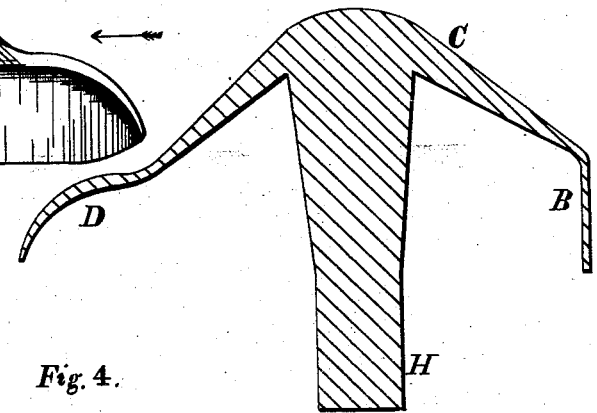
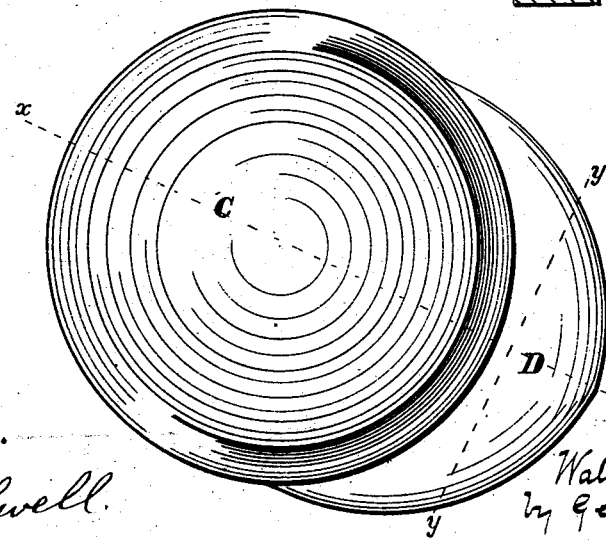
WITNESSES=
H.G. Phillips.
C. A. Colwell.
INVENTOR=
Walter Marks,
by Geo. B. Selden,
atty.

(Model.)
W. MARKS.
FERTILIZER DISTRIBUTER.
3 Sheets—Sheet 2
No. 260,764. Patented July 11, 1882.
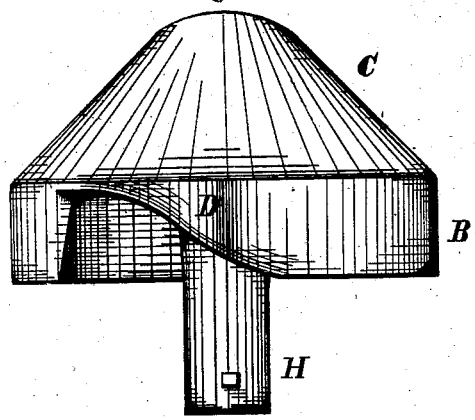
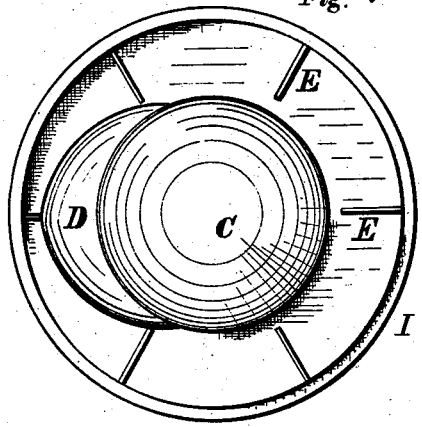
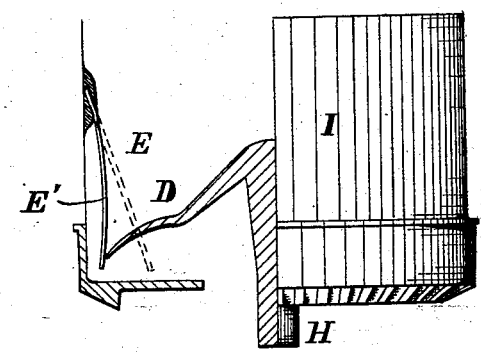
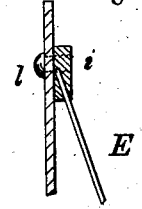
WITNESSES =
H. G. Phillips.
C. A. Colwell.
INVENTOR =
Walter Marks,
by Geo. B. Selden,
Atty.

(Model.)
3 Sheets—Sheet 3.
W. MARKS.
FERTILIZER DISTRIBUTER.
No. 260,764. Patented July 11, 1882.
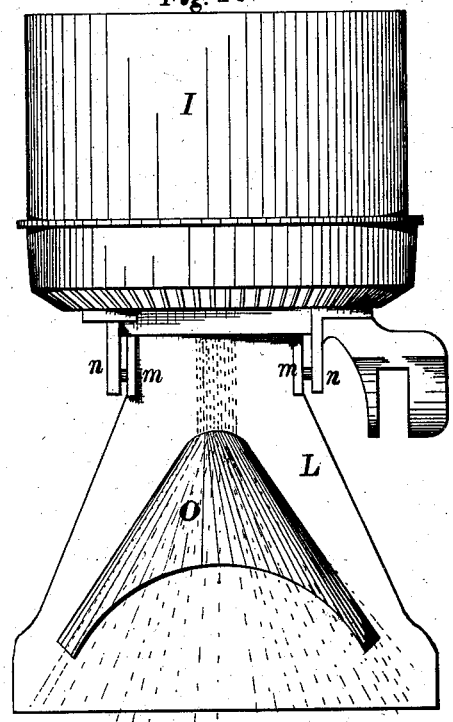
Fig. 10.
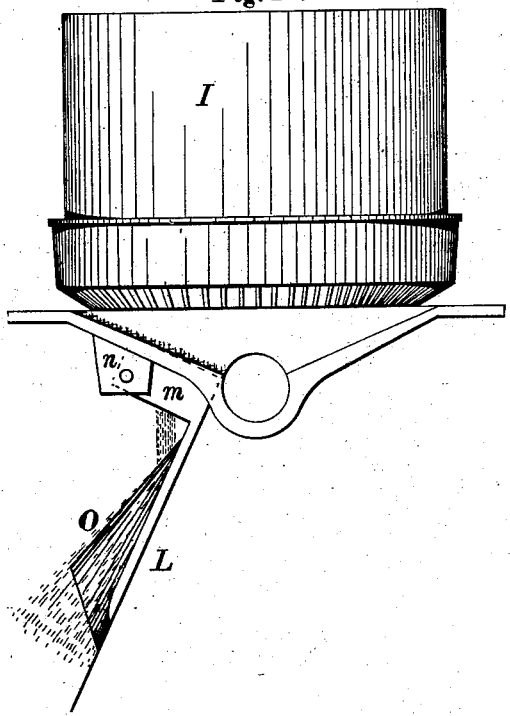
Fig. 11.
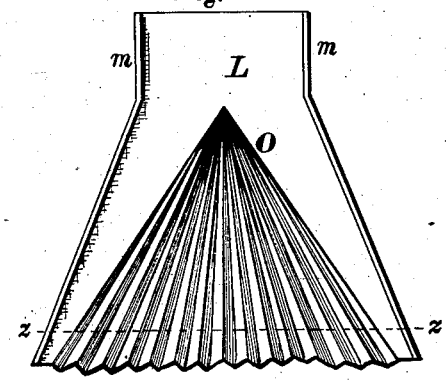
Fig. 12.
WITNESSES=
H. G. Phillips.
C. A. Colwell.
Fig. 13.
INVENTOR=
Walter Marks,
by Geo. B. Selden,
Atty.
N. PETERS, Photo-Lithographer, Washington, D. C.

UNITED STATES PATENT OFFICE.

WALTER MARKS, OF CHAPINVILLE, NEW YORK.

FERTILIZER-DISTRIBUTER.

SPECIFICATION forming part of Letters Patent No. 260,764, dated July 11, 1882.

Application filed March 6, 1882. (Model.)

*To all whom it may concern:*

Be it known that I, WALTER MARKS, of Chapinville, Ontario county, New York, have invented certain Improvements in Fertilizer-Distributers, which improvements are also applicable to machines for sowing cotton-seed, of which the following is a specification, reference being had to the annexed drawings.

My present invention relates to certain improvements on the fertilizer-distributer described in my prior Patent, No. 243,716, dated July 5, 1881; and it consists in an improved form of the feeding-shell and in the combination, with the feeding-shell, of spring-clearers, all as hereinafter more fully described.

My invention also consists in an improved spreader for sowing the fertilizing material broadcast.

My present improvements are represented in the accompanying drawings, in which Figure 1 is an inverted view of my improved feeding-shell. Fig. 2 is a side view of the same, showing the projecting lip. Fig. 3 is a central section of the same on the line *x x*, Fig. 4. Fig. 4 is a top view of the same. Fig. 5 is an elevation of the same, as seen from the direction indicated by the arrow in Fig. 2. Fig. 6 is a section through the lip on the line *y y*, Fig. 4. Fig. 7 is a plan view of the feed-cup and feeding-shell, showing the spring-clearers. Fig 8 is a half-sectional side elevation of the feed-cup, showing the operation of the spring-clearer. Fig. 9 is a section through the vertical wall of the feed-cup, showing a modified way of attaching the spring-clearer. Fig. 10 is a rear elevation of the feed-cup and spreader attached thereto. Fig. 11 is a side elevation of the same. Fig. 12 represents a modified form of spreader. Fig. 13 is a section on the line *z z*, Fig. 12.

The form of my improved feeding-shell is represented in the accompanying drawings. It differs from the spherical or dome-shaped shell described in my previously-mentioned patent, in that the exterior of my improved shell rises vertically for a short distance from the bottom of the feed-cup, as shown at B in the figures, and terminates above in a more or less acutely-pointed cone, C. It also differs from the prior feeding-shell, in that the under side of the projecting lip D is straight or formed in a plane parallel with the bottom of the feed-cup, experience having demonstrated that the recess under the lip, described in my prior patent before mentioned, is unnecessary with this form of shell, particularly when the spring-clearers E E are used, which effectually prevent any hairs, fibers, or other refuse from catching on the lip. The forward edge of the projecting lip is also inclined backward and its point rounded, as represented in the drawings, for the purpose of causing a smooth and easy action of the spring-clearers which are bent out of their normal position E, Fig. 8, into the position represented by the full lines E' at each revolution of the parts.

The vertical wall B of the feed-cup is circular in shape, being cut away from *f* to *g*, Fig. 1, to provide an opening for the entrance of the fertilizer. The wall continues from *g* forward to the point of the lip, being tapered gradually upward. The interior of the feeding-shell corresponds in shape with its exterior, the whole surface, both inside and out, being made smooth and continuous, and, as far as possible, without any angles or irregularities to hold the fertilizer or give it an opportunity to paste onto the metal constituting the shell. The outer margin of the projecting lip of the feed-shell is formed of a gradual curved shape, as represented in the drawings, Figs. 1 and 4, the object being to keep the edge free from any fibrous or hairy materials contained in the fertilizer, and this form of lip also presents less resistance to the spring-clearers E.

My improved feeding-shell is provided with a central spindle or lug, H, by which it is affixed to the frame which supports the feed-cup I.

It will be observed that when a recesss in rear of the forward edge of the lip of the feed-shell is used, as in my previous patent, the fertilizer in the cup must be raised or elevated, so as to pass over the curved upper surface of the feed-shell formed by the recess underneath. This causes an unnecessary stirring or agitation of the fertilizer in the feed-cup, which is entirely obviated with the form of feeding-shell herein described, in which both the upper and lower surfaces of the projecting lip are formed in planes parallel with each other and with the bottom of the feed-cup, so that the fertilizer remains relatively undisturbed by the rotating of the feed-cup until it arrives at the edge of the feed-cup. The fertilizer in the cup slides down the inclined sides of the cone and encounters the least possible resistance or disturbance on its passage to the discharge-opening with my present form of feeding-shell.

The clearers E, which consist of pieces of spring-metal projecting inward and downward from the interior vertical wall of the feed-cup, are fastened thereto by soldering or by being inserted in a block which is secured to the feed-cup by the screw $l$, so that the clearers may be removed or detached when it is not desired to employ them.

The clearers may be employed with good results when my improved fertilizer-distributer is used in sowing cotton-seed, which is usually mixed with fertilizer when planted.

Figs. 10, 11, 12, and 13 represent my improved spreader, which is designed to be used when sowing fertilizer broadcast. It consists of a plate attached to the fertilizer-distributer or the feed-tube thereof, so constructed and arranged as to spread the stream of fertilizer and distribute it over an area of ground of a width equal to the distance between the drill-teeth. It consists of a plate, L, provided with ears $m\ m$ at its upper end, by which it is fastened to the lugs $n\ n$ on the frame of the feed-cup, and having on its rear face a conical projection, O, which receives and distributes the falling fertilizer, as represented by the dotted lines in the rear view, Fig. 10. The spreader is represented in Figs. 10 and 11 as made of sheet metal, the cone or projection O being also struck up from sheet metal and affixed to the plate L by riveting or soldering.

In Fig. 12 I have represented a modification of my improvement, the spreader being formed of cast or sheet metal with a number of radiating or fan-shaped grooves on its upper surface, by which the fertilizer is spread outward, so as to be distributed uniformly on the ground.

I do not claim herein anything which has been shown or described in my previous patents.

I am aware that there has been heretofore described a fender operating in connection with a rotating seed-dropper having seed-cells on its margin to wipe off the surplus seeds that may adhere to the cells, as shown in the patent of Newton, No. 212,731, February 25, 1878; and I hereby disclaim any such construction. I also disclaim the rigid clearers shown in my Patent No. 236,900, June 25, 1881.

I am aware that, broadly considered, spreaders are not new, the same having been used in connection with various feeding devices, as shown, for instance, in the patents of Town, No. 208,549, October 1, 1878, and Kneisly, No. 134,293, December 24, 1872; and such arrangements I hereby disclaim, my present invention being limited to the specific combination shown, whereby I am enabled to continuously feed a gummy or sticky fertilizer broadcast—a result which cannot be accomplished by any of the previous devices.

I claim—

1. The herein-described feeding-shell for fertilizer-distributers, having vertical sides B, conical top C, and straight projecting lip, substantially as and for the purposes set forth.

2. The combination, with the rotating feed-cup I, of the stationary feed-shell D, provided with a curved projecting lip having a single discharge-orifice therein, and one or more yielding spring-clearers, E, attached to the interior of the feed-cup, projecting downward, and operating to clean the lip at each revolution of the feed-shell, substantially as and for the purposes set forth.

3. The herein-described feed-shell for fertilizer-distributers, provided with a projecting lip having its upper and lower surfaces formed in planes parallel to each other and to the bottom of the feed-cup, having its outer margin formed on a gradual curve, substantially as and for the purposes set forth.

4. The combination, with the rotary feed-cup I, stationary feed-shell C, provided with a projecting lip having discharge-orifice therein, of a suitable perforated supporting-frame for the feed-cup and the spreader L, attached to the frame, substantially as and for the purposes set forth.

WALTER MARKS.

Witnesses:
GEO. B. SELDEN,
H. G. PHILLIPS.